Dec. 17, 1929.  C. L. PUTNEY  1,740,265
AUTOMATIC CLUTCH CONTROL MECHANISM
Filed Aug. 16, 1927  2 Sheets-Sheet 1
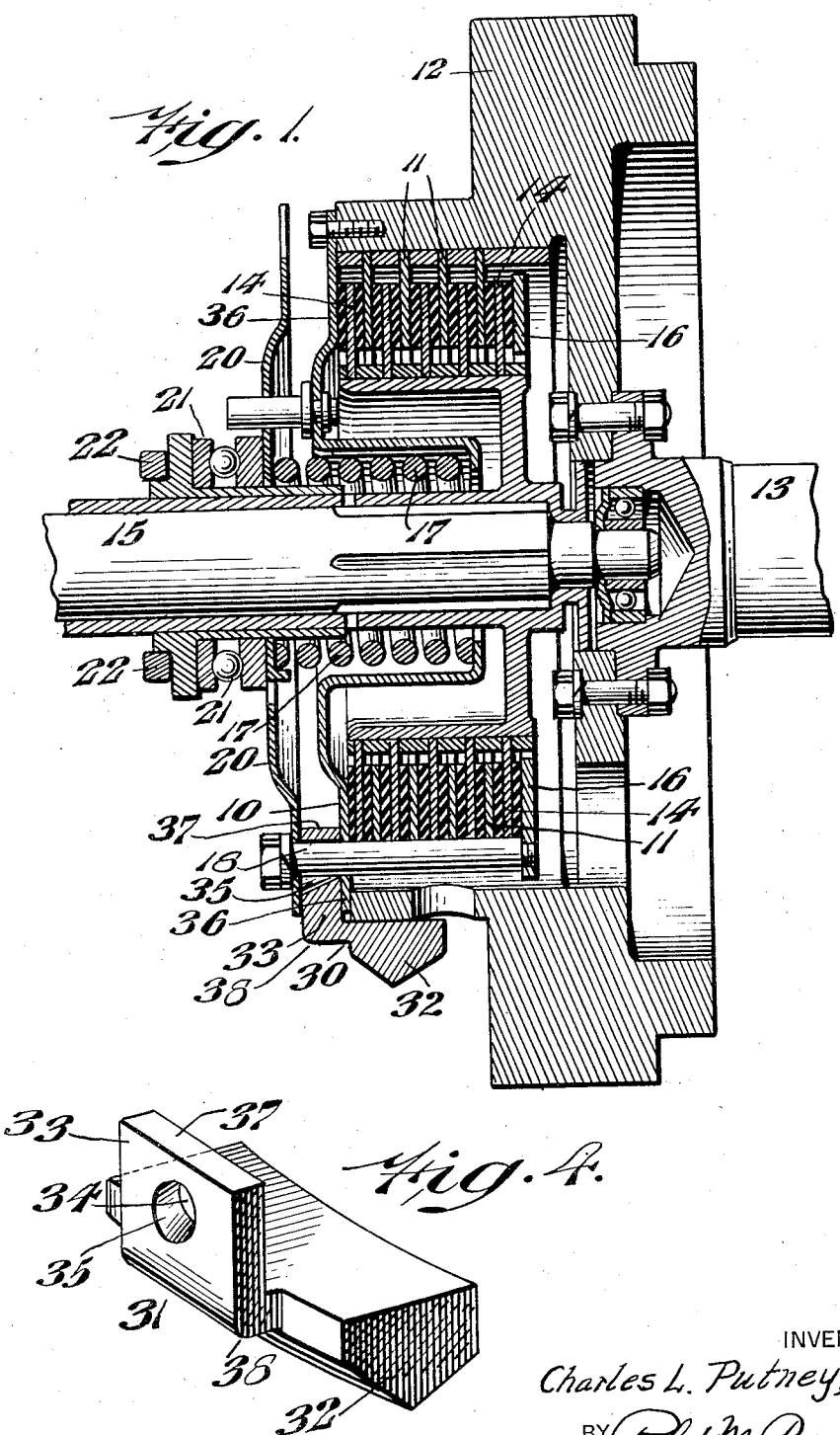
INVENTOR:
Charles L. Putney,
BY Robert M. Barr
ATTORNEY.

Dec. 17, 1929.  C. L. PUTNEY  1,740,265
AUTOMATIC CLUTCH CONTROL MECHANISM
Filed Aug. 16, 1927  2 Sheets-Sheet 2
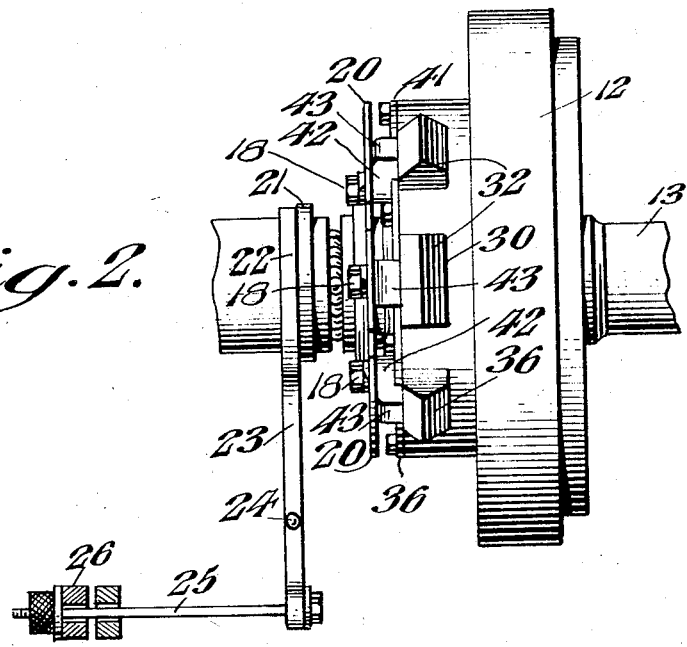
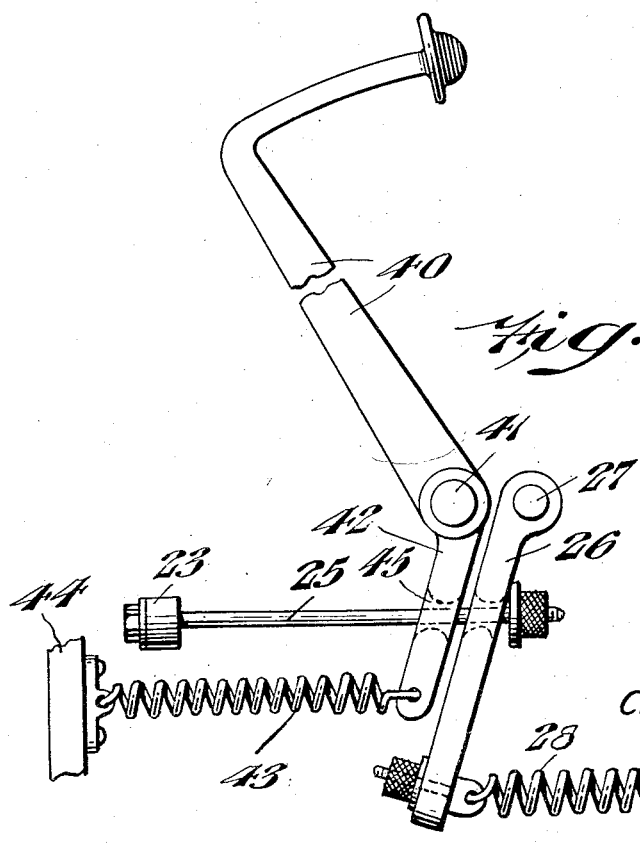
INVENTOR:
Charles L. Putney,
BY Robert M. Barr
ATTORNEY.

Patented Dec. 17, 1929

1,740,265

UNITED STATES PATENT OFFICE

CHARLES L. PUTNEY, OF PHILADELPHIA, PENNSYLVANIA, ASSIGNOR TO BENJAMIN F. ARGILE, OF ARDSLEY, PENNSYLVANIA

AUTOMATIC CLUTCH-CONTROL MECHANISM

Application filed August 16, 1927. Serial No. 213,289.

The present invention relates to power transmitting clutches and more particularly to an automatic control device governed by the speed of a rotating part to operate such a clutch.

A power transmitting clutch such as used on automobiles consists generally of a separable plate structure, one part of which is connected to the driving means and the other part of which is connected to the driven means, while the two parts are normally under the pressure of a spring to force and hold them together for power transmission. Another adjunct of the mechanism is a foot lever held by a spring in position to allow the aforesaid parts to assume clutching position, but when moved by the pressure of the foot it acts to separate or declutch the two plate parts.

Some of the objects of the present invention are to provide a control device for automobile clutches whereby the operation and control of such a clutch is automatic and the clutching effort bears a direct ratio to the speed of rotation of the clutch; to provide a clutch control mechanism wherein the customary clutch plate operating spring is dispensed with; to provide a clutch control mechanism in which centrifugally operated weights serve to control the clutching of the two parts of the clutch; to provide a device for automatically controlling the clutch of an automobile so that the engine can idle in gear without transmitting sufficient torque to the driving wheels to cause motion of the vehicle; to provide a clutch control mechanism wherein manual operation of a declutching lever is unnecessary; to provide an improved flexible control for automobiles; to provide a device for transforming a foot pedal controlled automobile clutch and manually operated transmission into an automatic control whereby manual control is unnecessary and the transmission can remain in high gear while the automobile is at rest, starting, and under all ordinary running conditions; to provide an attachment for automatic control of an automobile clutch which can be attached to the usual type of clutch quickly and easily and without change of clutch plates or fly wheel; to provide an automatic clutch control which does not interfere with the ordinary gear shifting operation of a car and hence the latter is always available for use if necessary; to provide other improvements as will hereinafter appear.

In the accompanying drawings, Fig. 1 represents a sectional side elevation of a clutch control mechanism embodying one form of the present invention; Fig. 2 represents a plan of the same; Fig. 3 represents a detail in side elevation of the declutching lever; and Fig. 4 represents a perspective of one of the control weights.

Referring to the drawings, one form of the present invention is shown as applied to a clutch 10 of the type used in Buick automobiles, though this is only by way of example and the scope of the invention is not to be limited because of this illustrated assembly. The clutch 10 consists generally of a plurality of ring plates 11 arranged to rotate with the fly wheel 12 which is fast to the engine or driving shaft 13. The driven plates 14 of the clutch 10 are connected to the driven shaft 15 and the two sets of plates 11 and 14 are brought into frictional engagement by the action of control plate 16 movable to clutching position through the action of a spring 17 which constantly exerts its pressure in the direction to move the control plate 16 to clutching position.

In order to exert a force in the direction opposite to the pressure of the spring 17, the control plate 16 is connected by a plurality of circumferentially disposed bolts 18 which project through the clutch parts and carry a ring 20 arranged in the path of movement of a thrust bearing shifter 21 operated by the fork 22 of a lever 23 which is arranged for either automatic control or manual control and selection of control is at the will of the operator of the vehicle. Thus by shifting the lever 23, the ring 20 will be moved either against the pressure of the spring 17 for declutching purposes or with the pressure of the spring 17 for clutching purposes.

For automatic control, the lever 23, which is pivoted at 24, has its free end connected by a bolt 25 to an arm 26 pivoted at 27 and held by a spring 28 stretched between it and a fixed part 30 so that the natural tendency of the spring 28 is to maintain the lever 23 in a position to place the ring 20 under pressure in opposition to the spring 17. This opposition, through adjustment of the spring 28 is sufficient to maintain the clutch control plate 16 in such a neutral position as will prevent the engagement of the clutch plates 11 and 14, the result being that the vehicle will remain at rest when the engine is turning at idling speed. It is obvious that the action of the spring 28 as regards clutch operation is the same as that accomplished manually by depressing the foot pedal 40.

In order to automatically control the movement of the lever 23 to clutch engaging position, a plurality of centrifugal weights 31 are provided and respectively mounted upon the bolts 18 in pivoted relation for swinging movement under the centrifugal action imparted by the rotation of the flywheel 12. Each of these weights 31 consists of a weight body 32 of generally rectangular shape, but longitudinally arc shaped to conform to the contour of the clutch periphery in order to lie close thereto in rest position, and a foot 33 substantially at right angles to the body 32 and provided with a hole 34 for the passage of its cooperating bolt 18. The hole 34 is bevelled at one side as shown at 35 to permit the weights 31 to move radially outward and relative to the adjacent parts. In assembled condition the foot 33 of each of the weights 31 lies between the ring 20 and the clutch face 36, and the relation of the parts is such that outward swing of the weight body 32 causes the toe 37 to fulcrum on the face 36 and the heel 38 to bear against the ring 20 to force the latter and the control plate 16 in the required direction to bring the clutch plates into clutching relation. The greater the centrifugal force the greater will be the pressure acting through the weight feet leverage to hold the clutch plates in frictional contact.

The mass of the weights 31 is so designed as to allow ordinary idling speeds of the motor without causing clutching movement of the ring 20 and since the spring 28 neutralizes the thrust of the clutch spring 17, and at the same time overcomes what little centrifugal force that the weights may exert, the transmission gears can be left in gear without any movement being transmitted to the vehicle.

For manual control of the control plate 16, the ordinary clutch pedal lever mechanism is employed and can be used at any time desired, as for example in case it becomes necessary to shift to intermediate gear for difficult hill climbing, or for reversing the direction of the vehicle. This mechanism consists of a clutch pedal lever 40 pivoted at 41 and having its short arm 42 connected to one end of a spring 43 which is stretched from a fixed point 44. The tension of the spring 43 is such as to maintain the clutch pedal 40 in the position corresponding to the ordinary clutching position of such a lever. The arm 42, however, instead of being connected to the bolt 25 as in the ordinary practice is provided with a through slot 45 to pass the bolt 25 to the lever arm 26. Since the arm 42 is located in close proximity to the arm 26, the depressing of the pedal 40, for declutching purposes, brings the arm 42 against the arm 26 so that both move together and consequently the arm 26 transmits its motion to the bolt 25 in a direction to shift the control lever to cause disengagement of the control plate 16. When this occurs, the transmission gears can be shifted manually as is ordinarily done. The use of the foot pedal however only occurs when the engine is running at higher than idling speed, as at idling speed the spring 28 fully declutches the clutch plates and the gears may be shifted to any position. At higher than idling speeds greater than normal foot pressure will be required to declutch due to the fact that the movement of the ring 20 to declutching position will be opposed by the centrifugal force of the weights 31 which on high speeds will be greater somewhat than the pressure exerted by the clutch spring 17.

In operation of the control mechanism, the spring 28 acting through arm 26, bolt 25 and lever 23, opposes the action of the clutch spring 17 and the centrifugal force of the weights 31, so that at idling speed of the motor the clutch plates 11 and 14 are disengaged and no motion is transmitted from the driving shaft 13 to the driven shaft 15. When the automobile is to be started the speed of the motor is increased to cause the weights 31 to move the friction plates into slipping engagement. This slipping engagement continues as long as the road resistance of the vehicle is greater than the torque exerted by friction plate contact. The slippage causes a smooth starting since there can be no sudden gripping of the clutch faces and also there is no danger of stalling the motor even though started in high gear, which is the normal position of the gear transmission with the mechanism of the present invention. As the speed of the motor increases due to decreased road resistance of the vehicle the outward swing of the weights 31 acts through the feet 33 to produce a leverage upon the movable ring 20 to move the latter and the control plate 16 whereby the clutch plates are held with increased friction and all slipping ceases during normal running conditions. Thus in starting upon the level the initial speed and torque may not completely overcome the road resistance until the motor reaches a speed of, say, five hundred revolutions per minute, while if starting on an upgrade the speed of the motor may reach one thousand revolutions per minute before the condition of non-slippage is brought about, but in both situations the automobile starts and accelerates without bucking, straining of the motor or mechanism, stalling, or other faults of improper clutching while in gear. When the vehicle is negotiating a difficult grade or when the road resistance becomes abnormally high, the engine will slow down in speed until a point is reached when the centrifugal weights will lose sufficient centrifugal force to maintain non-slipping engagement of the clutch plates and thus cause the plates to assume a slipping condition. Under this condition the engine will maintain speed and the vehicle slow down which corresponds to a normally operated automobile operating with increased torque due to a gear change, the result being that the automatic slipping of the clutch will accomplish the same effect as a gear change and carry the vehicle over the emergency condition in high gear which otherwise could not be accomplished.

I do not wish to limit myself to the exact construction as shown as certain departures can be made therefrom without departing from the spirit and intent of my said invention. For instance the operation of a clutch in a normal vehicle requires two movements. The first movement is to declutch. In all automobiles using clutches there is a declutching pedal, or mechanism, exterior of the clutch casing and in an accessible position, to which mechanism I propose to attach a spring of sufficient strength to overcome any clutching resistance. In the present design I have shown the usual clutching spring 17. This spring may be omitted by simply adjusting the spring 28 to overcome the centrifugal force of the weights 31 on idling speeds so that the clutch plates remain in a declutching position. The second movement is to clutch. In every automobile clutch in common use there is a plate or ring that controls the movement of the clutch plates. To this plate or ring I attach centrifugal weights that overcome the declutching spring and move the plate or ring in a direction to cause the plates to engage in an automatic manner, the same as if being operated by a skilled driver when he starts in high gear and allows the clutch plates to slip, either in starting or climbing a steep grade. To attach the weights to the controlling ring or plate may require different mechanism than shown or the weights themselves may be of a different contour.

It will be apparent that a simple and complete clutch control has been devised which can be readily attached to the ordinary forms of automobile clutches without disassembling such clutches or removing or replacing parts. While centrifugally controlled clutches are not broadly new those heretofore patented and described are in the nature of a complete unitary structure and none, in so far as applicant is aware, are practical as an optionally operated mechanism with an ordinary automobile clutch. These prior devices all require a complete reorganization and rearrangement of clutch parts which when made results in a new clutch structure inoperative as an ordinary manually controlled clutch.

All such devices are complicated comprising many concealed parts requiring delicate adjustment which may be thrown out of operative balance by a slight change of idling speed which can be had from many causes, and entirely incapable of attachment to any ordinary automobile clutch. The present invention is fully distinguishable from such unitary, cumbersome structures because it is a simple attachment which can be quickly applied to any ordinary clutch without disturbing the manual control of such clutch but which in operation automatically replaces the manual control while leaving the latter available for instant use without stopping the automobile.

Having thus described my invention, I claim:

1. A power transmitting control comprising a driven member, a clutch plate connected to a driven member, a driving member, a clutch plate connected to said driving member and arranged in the path of movement of said driven plate, a ring spaced from said plates, a control element, fastening devices rigidly connecting said ring to said control element, centrifugal weights respectively pivoted on said fastening devices and arranged to control the movement of said ring, a declutching lever for manual control of said element, and a spring normally holding said lever in position to prevent transmission of torque from one plate to another at idling speeds of said driving member.

2. A power transmitting control comprising in combination a driving clutch plate and a driven clutch plate, a control lever, an actuating connection between said lever and said driving clutch plate, a spring acting on said lever to cause said connection to hold said driving plate in non-motion transmitting relation to said driven plate, centrifugal means acting on said connection in opposition to said spring to move said driving plate into motion transmitting relation to said driven plate, a pedal lever pivotally mounted to swing into engagement with said control lever to cause said control lever to shift said connection to permit the withdrawal of said driving plate from said driven plate, and a spring normally holding said pedal lever out of contact with said control lever.

Signed at Philadelphia, county of Philadelphia, State of Pennsylvania, this 10th day of August, 1927.

CHARLES L. PUTNEY.